United States Patent

Strater et al.

[15] 3,673,983

[45] July 4, 1972

[54] HIGH CAPACITY DEPOSITION REACTOR

[72] Inventors: Kurt Strater, Brookside; William Bernard Hall, Belle Meade; Eugene Michael Mihalick, Flemington, all of N.J.; William Charles Stever, Kellers Church, Pa.

[73] Assignee: RCA Corporation

[22] Filed: April 27, 1970

[21] Appl. No.: 32,301

[52] U.S. Cl. ....... 118/48

[51] Int. Cl. ....... C23c 13/08

[58] Field of Search ....... 118/48–49.5; 148/175; 117/106 A

[56] References Cited

UNITED STATES PATENTS

| | | | |
|---|---|---|---|
| 3,190,262 | 6/1965 | Bakish et al. | 118/48 X |
| 3,089,788 | 5/1963 | Marinace | 118/48 X |
| 3,441,000 | 4/1969 | Burd et al. | 148/175 X |

*Primary Examiner*—Morris Kaplan
*Attorney*—Glenn H. Bruestle

[57] ABSTRACT

A deposition reactor including a housing having a gas passageway therein. A heater plate forms the bottom surface of the gas passageway and has a heated surface within the passageway upon which substrates may be placed. Means are provided for passing a flow of gas with a controlled turbulence in a laminar mode over the substrates, while the housing and passageway are cooled so that only the heater plate and the substrates are at the elevated temperature.

1 Claim, 7 Drawing Figures

INVENTORS
KURT STRATER,
WILLIAM B. HALL,
EUGENE MIHALIK and
WILLIAM C. STEVER.

BY D. J. Hoffman
ATTORNEY

INVENTORS.
KURT STRATER,
WILLIAM B. HALL,
EUGENE MIHALIK and
WILLIAM C. STEVER.
BY D. J. Hoffman
ATTORNEY

HIGH CAPACITY DEPOSITION REACTOR

BACKGROUND OF THE INVENTION

The invention herein described was made in the course of or under a contract or subcontract thereunder with the Department of the Air Force.

This invention relates to the fabrication of semiconductor devices. More particularly, this invention relates to apparatus for the deposition of a film of an insulating material from a gaseous-phase onto a semiconductor substrate.

Prior gaseous-phase deposition reactors have had several significant fabrication and operational difficulties. This has been particularly true of reactors for depositing an insulating film on a semiconductor substrate where the gaseous reaction is highly exothermic. Usually, a silicon dioxide film is deposited upon a semiconductor substrate by reacting silane gas with oxygen. The reaction occurs rapidly, and the insulating material quickly precipitates from the gas and deposits on all the heated surfaces of the reactor. Thus, the deposited material forms and clings to the reactor walls; and as a result, the reactor must be frequently disassembled and cleaned before further material can be deposited.

Additionally, the prior art reactors have had a limited substrate capacity due to the inherent nature of the exothermic reaction and limitations in the reactor fabrication. Several basic types of reactors have been used in the past. One type is a planetary gear reactor in which a specific number of substrates are rotated on a planetary gear platform to insure a uniform material deposition; or alternately, a rotating disc may be used in place of the planetary gears. However, only a few substrates with a limited maximum diameter may be deposited at any one time with either type of reactor. Additionally, on the planetary gear type, the material is deposited on all the mechanical parts of the reactor and is ground up between planetary gears and redeposited upon the substrates as impurities.

Other reactors place a number of substrates in an elongated quartz tube and pass a flow of gas over their heated surfaces; however, these reactors also have serious limitations. First, the active constituent of the gas (silane) is rapidly depleted along the length of the heated surface due to the exothermic nature of the gas reaction ($SiH_4 + O_2 = SiO_2 + H_2$ or $H_2O$). Thus, the usable length of the reaction chamber is inherently quite limited. Second the width of the reaction chamber is also quite limited due to the inherent nature of the quartz tube because quartz can only be made in commercial quantities in limited widths or diameters without it collapsing under the heat and strain. Third, the reactor must be frequently disassembled and cleaned, since it has to be heated to the reaction temperature like the other reactors. This is very time consuming since the quartz system must be cooled slowly, and for a reaction temperature of about 300° C. the cooling can take up to about two hours.

DESCRIPTION OF THE PREFERRED EMBODIMENTS

Figures 1, 2:
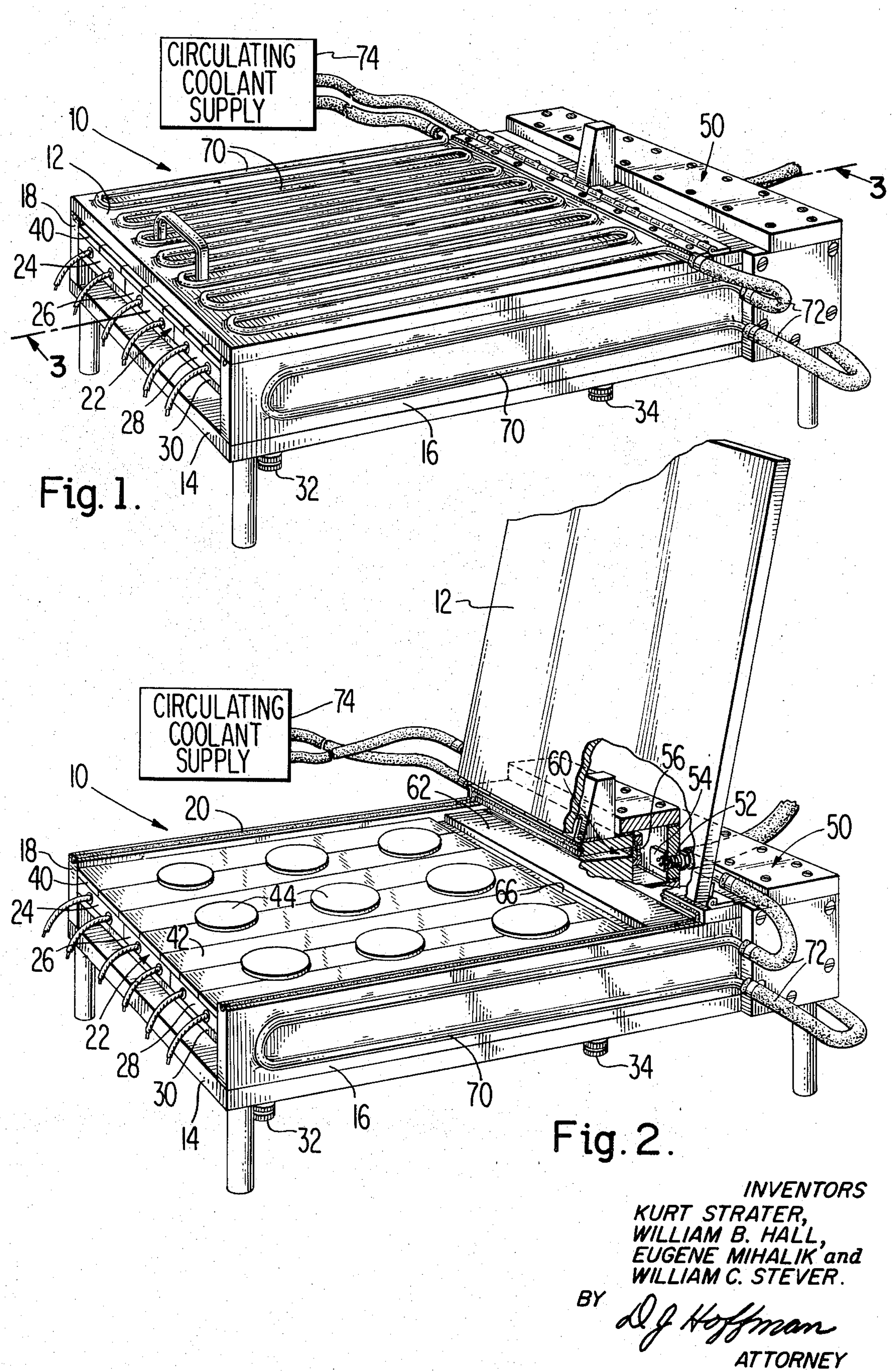
FIG. 1 is a perspective view of a typical deposition reactor of the present invention.
FIG. 2 is another perspective view of the deposition reactor with the lid open to allow loading of the semiconductor substrates.
Figure 3:
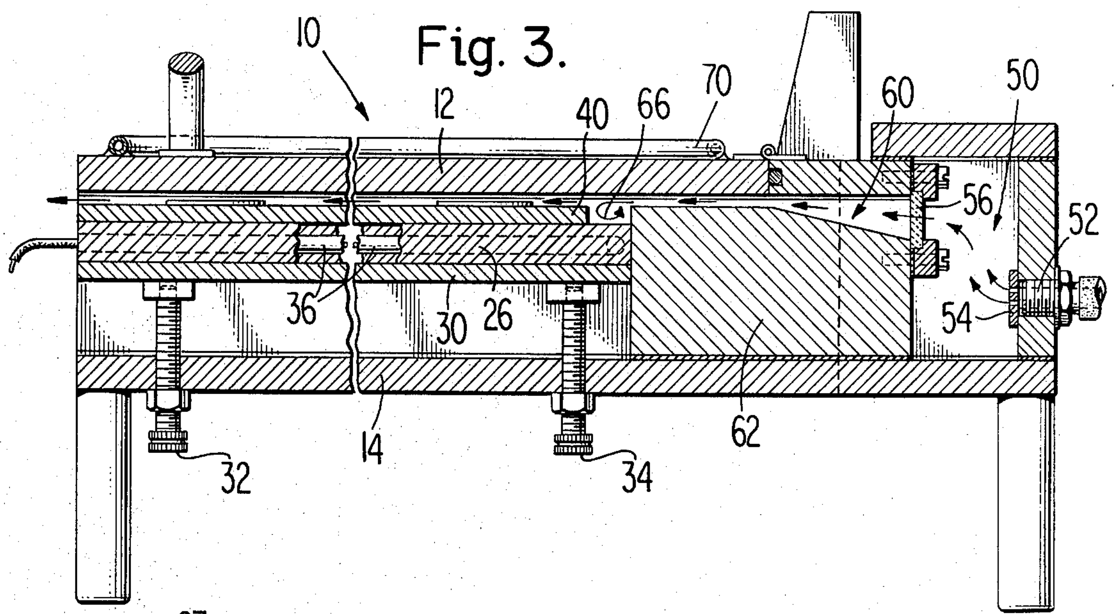
FIG. 3 is a cross-sectional view of the deposition reactor taken along the lines 3—3 of FIG. 1.

FIGS. 1-3 are perspective and cross-sectional views of a typical deposition reactor of the present invention. The reactor includes a housing 10 having a gas passageway therein, where the passageway is best illustrated by the gas flow arrows shown in FIG. 3. In the present reactor, the housing 10 is fabricated in the form of an elongated box-like structure having a large-area top 12 and bottom 14, and two sides 16 and 18. The top plate 12 is hinge mounted to form a lid, which may be lifted as shown in FIG. 2, to allow easy access to the interior of the housing 10. Preferably, the housing 10 is fabricated out of a high thermal conductivity material, such as aluminum; however, a high melting point metal such as stainless steel may be used when high temperature reactions are desired. To insure a proper air-tight seal throughout the housing 10, the interface between each of the plates contains some form of gasket 20, such as the neopyrene seal 20 shown in FIG. 2. Additionally, some form of pressure (not shown) may be applied to the lid 12 to insure that the lid 12 makes a proper seal along the length of the gasket 20.

The housing 10 includes a heater assembly 22 which defines the bottom wall of the gas passageway. In the present reactor, the heater assembly 22 includes three metal blocks 24, 26, and 28 which are placed lengthwise across the width of the housing 10 on a supporting plate 30. The supporting plate 30 is slidably mounted between the side plates 16 and 18, and the height and angle of the entire heater assembly 22 may be adjusted by the bolts 32 and 34. Each of the heater blocks 24, 26 and 28 contains two resistance heater elements 36, best shown in FIG. 3, which extend through the entire length of the heater blocks. For example, a set of 1,000-watt Watlow Firerod heaters 12 inches long are used as the heating elements 36 in the present reactor. A number of small plates 40 which comprise the actual deposition surface are then placed on the heater blocks 24, 26 and 28. Small plates are used rather than one large one to prevent buckling due to thermal expansion of the metal during heating. Thus, the plates 40 provide a relatively flat surface 42 upon which a large number of substrates 44 may be placed as desired.

The housing 10 also includes a plenum chamber 50 at the opposite end of the gas passageway from the heater assembly 22. The plenum chamber 50 extends across the width of the housing 10 and includes a gas inlet port 52 which is connected to the desired gas supply. A baffle 54 may be placed across the gas port 52 to help distribute the gas throughout the plenum chamber 50. In addition, a porous or perforated plate 56 extends across the exit of the plenum chamber. Thus, the plenum chamber 50 equalizes the gas pressure across the entire width of the housing 10.

The gas flow then enters a flow control chamber 60 which is disposed between the plenum chamber 50 and the heated surface 42. The flow control chamber 60 helps to channel the gases to provide a gas flow having a controlled turbulence in laminar mode over the heated surface 42. Although the characteristics of the gas flow are primarily dependent upon the reactor design and the gas pressure, the specific design of the flow control chamber 60 is not particularly critical for there are a number of suitable chamber designs to chose from. In the present reactor, the chamber 60 includes an inclined plate 62 which extends across the width of the housing 10. The plate 62 constricts the cross-sectional area of the gas passageway and helps to create the desired laminar gas flow across the width of the passageway.

In the present reactor, a gap 66 is positioned between the front edge of the heated surface 42 and the far edge of the plate 62 to provide the desired turbulence to the laminar flow emanating from the chamber 60, as best shown in FIG. 3. The gap 66 is easily obtained by placing the plates 40 on the blocks 24, 26 and 28 at a small distance from the plate 62. The controlled turbulence allows the gas to circulate with slight multidirectional components relative to the general direction of flow across the heated surface 42. As a result, a very uniform gas flow configuration is created which prevents preferential streaking of the gas across the surface 42 parallel to the direction of the gas flow. Additionally, the slight turbulence allows more of the gas in the gas flow to come in contact with the heated surface 42; and thus creates a more efficient depletion of the silane in the gas flow.

Figure 4A:
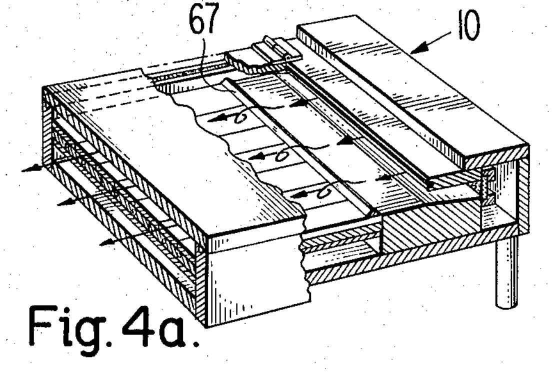
FIGS. 4*a*–4*c* illustrate several alternate embodiments of the present reactor.
Figure 4B:
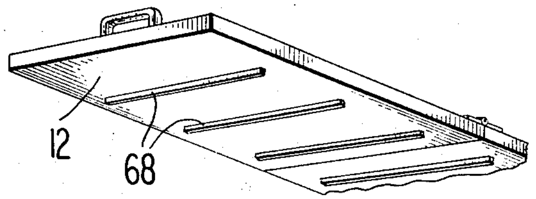
Figure 4C:
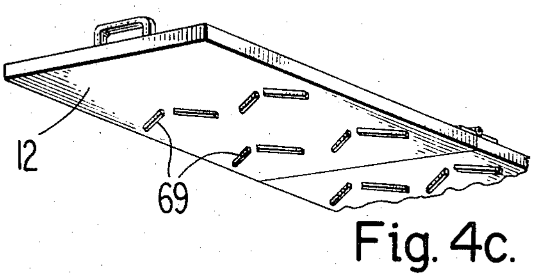

There are a number of alternate means for creating the desired turbulence, a few of which are shown in FIG. 4. As shown in FIG. 4a, a weir 67 (any shape) may be placed at the entrance of the heated surface 42. Alternatively, as shown in FIGS. 4b and 4c, one or more blade turbulators 68 and 69 may be placed on the floor or ceiling of the passageway to create the same result.

The gas flow then extends across the heated surface 42 and exits from the housing 10 across the entire width of the heated surface 42. The gas is then collected by some form of exhaust system (not shown).

The reactor also includes means for cooling the housing and passageway so that only the heater assembly 22 and the substrates 44 are at the elevated temperature. In the present reactor, the cooling assembly includes a copper tubing pattern 70 soldered to the outside surface of the top 12, bottom 14 and sides 16 and 18 of the housing 10. The various parts of the tubing 70 are interconnected with rubber hose 72, and the entire system is connected to a circulating coolant supply 74. The coolant can be either a gas or liquid depending upon how much of a temperature gradient is desired. Usually, however, water is quite sufficient and it will cool the reactor to less than room temperature.

EXAMPLE

The present reactor has particular utility in the deposition of a silicon dioxide film on a large number of semiconductor substrates. In this reaction, a mixture of silane, oxygen and nitrogen are premixed and fed into the plenum chamber 50 through the entrance port 52. Since the silane reaction is highly exothermic, a dilute mixture is necessary to prevent the reaction from occurring at room temperature. It is suggested that a concentration of less than 1.0 percent silane should be used so that the mixture will not begin to react until a temperature between 140 and 270° C. is reached.

In the present example, the reactor is adjusted so that the reaction will occur at a temperature of 325° C. First, the heater assembly 22 is adjusted so that the height of the gas passageway above the heated surface 42 is about 0.25 inches. The resistance heaters 38 are then adjusted to the proper current to provide a uniform 325° C. temperature across the surface 42 of the plates 40. At the same time, water is circulated through the cooling assembly so that the housing 10 and the remainder of the gas passageway remain cooled to room temperature while the heater assembly 22 is elevated to the reaction temperature. When the desired surface 42 temperature is obtained, the gas mixture is passed through the gas passageway with a pressure of about 0.5–5 psi in the plenum chamber 50. The semiconductor substrates 44 are then placed on the heated surface 42 and the lid 12 is securely pressed in place. When the substrates 44 reach the reaction temperature, the gas mixture begins to deposit a film of silicon dioxide on their heated surfaces. When the desired thickness of material is deposited upon the substrates 44, the reactive gas is purged with a neutral gas and the lid 12 is opened and the substrates 44 are removed from the reactor.

Figure 5:
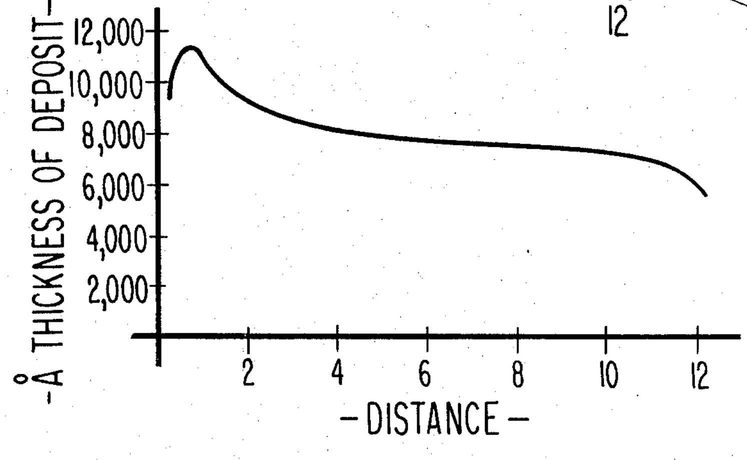
FIG. 5 is a graph which plots the rate of deposition of a silicon dioxide film as a function of distance in the present reactor.

As shown in FIG. 5, the present reactor deposits a highly uniform film across a large area of the heated surface 42. FIG. 5 is a graph which plots the rate of deposition for the present reactor as a function of the distance of the gas flow across the heated surface 42. Most of the deposition occurs over a 12-inch length of heated substrate 42; and because of the depletion of the active constituent in the gas (silane), a highly uniform deposition is obtained in the central 8-inch region. Thus, the length of the reactor is essentially limited because of the depletion to a region about 12 inches long; however, there are no limitations on the width of the present reactor. Since the entire reactor can be made of precision machined, high strength metals; the width essentially can be extended as much as it is desired. Thus, the width can even be longer than the length when a high capacity reactor is desired. In comparison, the width of quartz reactors is limited to a few inches. Additionally, the present reactor remains at room temperature and is free of critical expansion and contraction due to heat and cooling problems inherent in the prior art reactors.

Since the heated surface 42 is only part of the gas passageway which is at or above the reaction temperature, the substrates 44 and the heated surface 42 are essentially the only parts of the reactor upon which the film is deposited. Thus, the gas passageway requires little cleaning. Additionally, the lid 12 provides easy access to the gas passageway without having to wait for the entire reactor to be cooled and disassembled. Thus, the heated surface 42 can be readily cleaned and prepared for a new deposition cycle.

We claim:

1. A deposition reactor for depositing a film of a material from a gaseous-phase onto a substrate comprising:

a. a housing having a top wall and a bottom wall disposed between a pair of opposite side walls, said bottom wall comprising a plurality of heater blocks having heating elements therein, a plate supporting said heater blocks, and a plurality of heater plates, each smaller than a heater block, disposed on said heater blocks, said top and bottom walls defining a gas passageway therebetween;

b. said plurality of heater plates defining a substantially continuous flat heated surface of the bottom wall of said passageway upon which substrates may be placed; said top wall comprising a removable lid providing access to said heated surface;

c. means including said plurality of heater plates changing the cross-sectional dimensions of a portion of said passageway for passing a flow of gas with a controlled turbulence in a laminar mode over said substrates; and d. means including tubing fixed in a heat exchange relationship with said side walls and said removable lid for cooling said housing and passageway so that only the heater plates and the substrates can be heated to an elevated temperature.

* * * * *